United States Patent
Sato

(10) Patent No.: US 8,511,835 B2
(45) Date of Patent: Aug. 20, 2013

(54) IMAGE PROCESSING APPARATUS AND IMAGE PROCESSING METHOD

(75) Inventor: Yosuke Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 197 days.

(21) Appl. No.: 13/207,551

(22) Filed: Aug. 11, 2011

(65) Prior Publication Data

US 2012/0062588 A1   Mar. 15, 2012

(30) Foreign Application Priority Data

Sep. 10, 2010   (JP) ................................. 2010-203300

(51) Int. Cl.
*G06T 5/00*   (2006.01)

(52) U.S. Cl.
USPC ............... 353/69; 353/70; 353/121; 382/264; 382/293

(58) Field of Classification Search
USPC .................... 353/69, 70, 121, 122; 382/264, 382/260, 266, 293–300
See application file for complete search history.

(56) References Cited

U.S. PATENT DOCUMENTS

| 5,995,677 | A  | * | 11/1999 | Jones | 382/276 |
| 7,470,032 | B2 | * | 12/2008 | Damera-Venkata et al. | ... 353/94 |
| 7,471,843 | B2 | * | 12/2008 | Messing et al. | 382/260 |
| 8,106,949 | B2 | * | 1/2012 | Tan et al. | 348/180 |
| 8,212,945 | B2 | * | 7/2012 | McFadyen et al. | 348/745 |

FOREIGN PATENT DOCUMENTS

JP   2009-44488 A   2/2009

* cited by examiner

*Primary Examiner* — William C Dowling
(74) *Attorney, Agent, or Firm* — Fitzpatrick, Cella, Harper & Scinto

(57) ABSTRACT

A CPU generates an image by performing inverse projection transformation for an input image by using an inverse matrix of a matrix which enlarges a size of the input image. When a position A on the input image is transformed into a position B on the generated image by the inverse projection transformation, the CPU obtains a ratio of a distance between pixels around the position B to a distance between pixels around the position A. The CPU calculates filter coefficients for a low-pass filter using a product of a Nyquist frequency of the input image and the ratio as a cutoff frequency. The CPU obtains a sum of results obtained by multiplying pixel values of pixels in a pixel array including the position A in the input image by the filter coefficients, as a pixel value at the position A in an image having undergone filter processing.

5 Claims, 12 Drawing Sheets

80% REDUCTION : INPUT IMAGE

50% REDUCTION : INPUT IMAGE

80% REDUCTION :
FILTER PROCESSING (PRIOR ART)

50% REDUCTION :
FILTER PROCESSING (PRIOR ART)

80% REDUCTION :
OUTPUT IMAGE (PRIOR ART)

50% REDUCTION :
OUTPUT IMAGE (PRIOR ART)

80% REDUCTION:
FILTER PROCESSING (PRESENT INVENTION)

50% REDUCTION:
FILTER PROCESSING (PRESENT INVENTION)

80% REDUCTION:
OUTPUT IMAGE (PRESENT INVENTION)

50% REDUCTION:
OUTPUT IMAGE (PRESENT INVENTION)

IMAGE PROCESSING APPARATUS AND IMAGE PROCESSING METHOD

BACKGROUND OF THE INVENTION

1. Field of the Invention

The present invention relates to an image processing technique and, more particularly, to a keystone correction processing technique for correcting keystone distortion in a front projector or the like.

2. Description of the Related Art

As a technique of electronically correcting trapezoidal distortion of an image which occurs when a liquid crystal projector projects the image on a screen, an electronic trapezoidal distortion correction processing technique has been conventionally known (Japanese Patent Laid-Open No. 2009-44488).

The electronic trapezoidal distortion correction processing technique deforms the shape of an image so as to cancel out trapezoidal distortion to project the resultant image as an image having the same shape as that of the original image. Performing interpolation/resampling processing will generate an image corresponding to the deformed shape.

The electronic trapezoidal distortion correction processing technique reduces an image when deforming its shape. With a reduction in image, high-frequency components of the spatial frequency components of the image become aliasing noise, resulting in image deterioration such as moire.

To reduce such deterioration, filter processing is performed. However, a conventional technique performs filter processing by using a filter having a predetermined cutoff frequency independently of the positions of the pixels in an image before shape deformation processing.

After the shape deformation, the distances between adjacent pixels change, and the cutoff frequency in filter processing changes. For this reason, in various regions in the image after the shape deformation, the cutoff frequency in the filter processing does not coincide with the Nyquist frequency in resampling of the image after the shape deformation. For this reason, the conventional technique has a problem that an image excessively blurs and moire remains, resulting in a deterioration in image quality.

SUMMARY OF THE INVENTION

The present invention has been made in consideration of the above problem, and provides a technique of allowing to obtain an image with good image quality even if pixel position correction associated with keystone correction is performed.

According to the first aspect of the present invention, an image processing apparatus comprising: a unit which generates an inverse projection image by performing inverse projection transformation for an input image by using an inverse matrix of a projection transformation matrix which enlarges a size of the input image; a first calculation unit which, when a position of a pixel of interest on the input image is transformed into a position of an inverse projection pixel of interest on the inverse projection image by the inverse projection transformation, calculates a ratio of a distance between pixels around the position of the inverse projection pixel of interest to a distance between pixels around the position of the pixel of interest; a second calculation unit which calculates filter coefficients for a low-pass filter using a product of a Nyquist frequency of the input image and the ratio as a cutoff frequency; and a filter unit which calculates a sum of results obtained by multiplying pixel values of pixels in a pixel array including the position of the pixel of interest in the input image by the filter coefficients, as a pixel value at the position of the pixel of interest in an image having undergone filter processing.

According to the second aspect of the present invention, an image processing method performed by an image processing apparatus, comprising: a step of generating an inverse projection image by performing inverse projection transformation for an input image by using an inverse matrix of a projection transformation matrix which enlarges a size of the input image; a first calculation step of, when a position of a pixel of interest on the input image is transformed into a position of an inverse projection pixel of interest on the inverse projection image by the inverse projection transformation, calculating a ratio of a distance between pixels around the position of the inverse projection pixel of interest to a distance between pixels around the position of the pixel of interest; a second calculation step of calculating filter coefficients for a low-pass filter using a product of a Nyquist frequency of the input image and the ratio as a cutoff frequency; and a filter step of calculating a sum of results obtained by multiplying pixel values of pixels in a pixel array including the position of the pixel of interest in the input image by the filter coefficients, as a pixel value at the position of the pixel of interest in an image having undergone filter processing.

Further features of the present invention will become apparent from the following description of exemplary embodiments with reference to the attached drawings.

DESCRIPTION OF THE EMBODIMENTS

The embodiments of the present invention will be described below with reference to the accompanying drawings. Note that each embodiment described below shows an example in which the present invention is concretely carried out, and is one of the specific embodiments defined in the scope of claims.

[First Embodiment]

Figure 1:
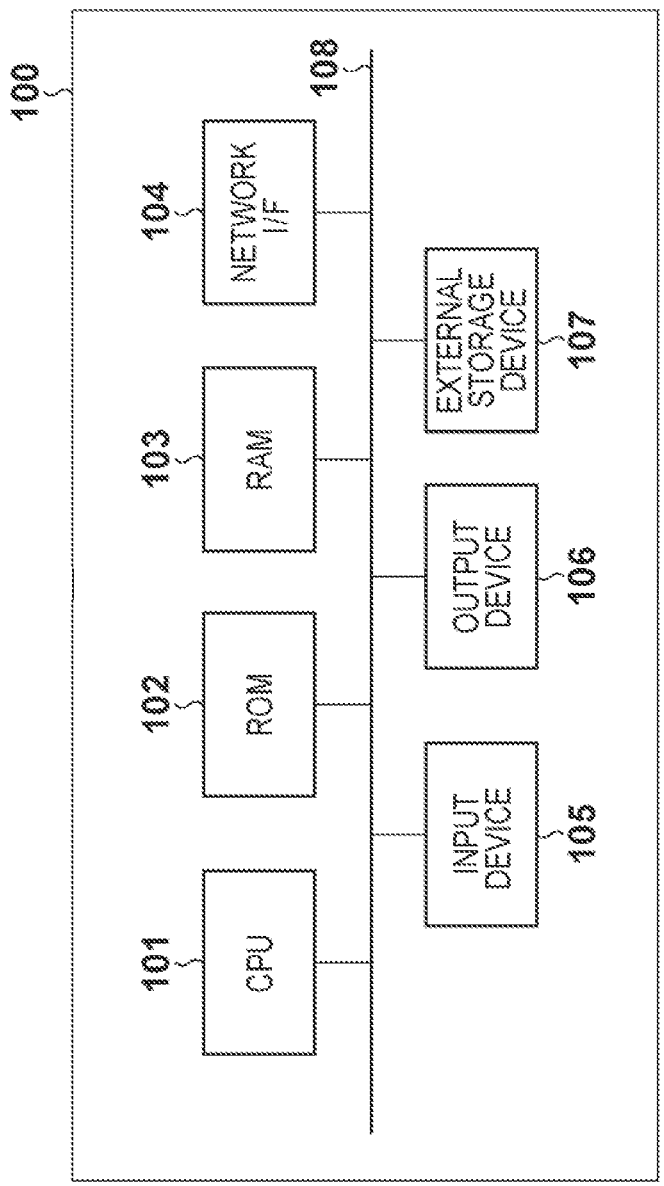
FIG. 1 is a block diagram showing an example of the hardware arrangement of a computer 100.

An example of the hardware arrangement of a computer 100 functioning as an image processing apparatus will be described first with reference to the block diagram of FIG. 1. Note that FIG. 1 shows only components which are mainly used for the following description. It is possible to add other components or omit some of the components in some cases.

A CPU 101 controls the overall operation of the computer 100 by using computer programs and data which are stored in a ROM 102 and a RAM 103, and executes each process to be described as a process to be executed by the computer 100.

The ROM 102 stores set data and a boot program for the computer 100. The RAM 103 has an area for temporarily storing computer programs and data acquired via an input device 105 and a network I/F 104 and computer programs and data loaded from an external storage device 107. The RAM 103 further has a work area to be used when the CPU 101 executes various kinds of processes. That is, the RAM 103 can provide various kinds of areas, as needed.

The network I/F 104 is used to perform data communication with external devices via a network (wired or wireless) such as a LAN or the Internet. The input device 105 is a pointing device such as a mouse or a keyboard, which is operated by the user to input various kinds of instructions. The user can input various kinds of instructions to the CPU 101 by operating the input device 105. Note that the input device 105 may be an imaging unit which captures still images or moving images of objects. In this case, the computer 100 is a digital camera or a video camera.

An output device 106 includes a liquid crystal screen or a CRT, and can display the processing result obtained by the CPU 101 in the form of images, texts, and the like. An external storage device 107 is a large-capacity information storage device such as a hard disk drive. The external storage device 107 stores an OS (Operating System), computer programs and data for making the CPU 101 execute various kinds of processes (to be described later) as processes to be performed by the computer 100, and various kinds of information (to be described later) as known information. The computer programs and data stored in the external storage device 107 are loaded into the RAM 103, as needed, under the control of the CPU 101, to be processed by the CPU 101. The above components are connected to a bus 108.

The differences between conventional keystone correction processing and keystone correction processing according to this embodiment will be described next with reference to FIGS. 2A to 2J. FIGS. 2A to 2J each show the frequency characteristic of an image signal in a given region (region of interest) in an input image to be subjected to keystone correction processing. Referring to each of FIGS. 2A to 2J, the abscissa represents the frequency, and the ordinate represents the frequency spectrum power.

When keystone correction processing is performed for an input image, the distances between pixels in the image having undergone the keystone correction processing become smaller than those in the input image. The ratios at which the distances reduce will be referred to as "reduction ratios" hereinafter. These reduction ratios vary for the respective pixel positions in an input image.

FIGS. 2A, 2C, 2E, 2G, and 2I each show a case in which a region of interest is displayed upon reduction in display resolution to 80% that of an input image. FIGS. 2B, 2D, 2F, 2H, and 2J each show a case in which the region of interest is displayed upon reduction in display resolution to 50% that of an input image. In the following description $\omega N$ represents the Nyquist frequency of an image signal representing an input image, and $\omega s$ represents the sampling frequency of the image signal representing the input image. In this case, according to the Nyquist sampling theorem, the relationship between the sampling frequency $\omega s$ and the Nyquist frequency $\omega N$ satisfies $\omega s = 2 \times \omega N$.

Figure 2A:
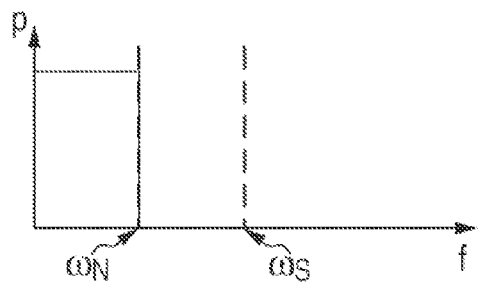
FIGS. 2A to 2J are graphs for explaining the differences in keystone correction processing between the prior art and an embodiment.
Figure 2B:
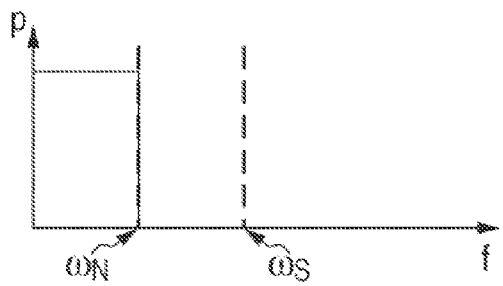
Figure 2C:
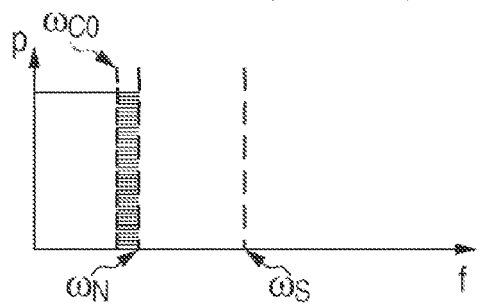
Figure 2D:
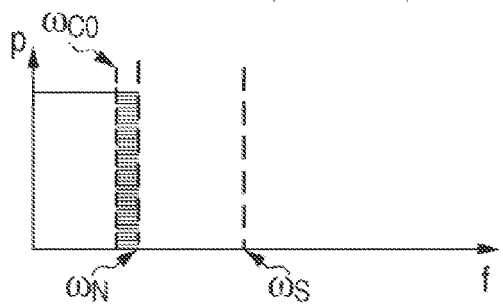

Conventionally, when filter processing with a cutoff frequency $\omega c0$ is performed for a region of interest having a frequency characteristic like that shown in FIG. 2A, that is, a region with a reduction ratio of 80%, the frequency band from the cutoff frequency $\omega c0$ to the Nyquist frequency $\omega N$ is cut off, as shown in FIG. 2C. Likewise, conventionally, when filter processing with the cutoff frequency $\omega c0$ is performed for a region of interest having a frequency characteristic like that shown in FIG. 2B, that is, a region with a reduction ratio of 50%, the frequency band from the cutoff frequency $\omega c0$ to the Nyquist frequency $\omega N$ is cut off, as shown in FIG. 2D. In each case, $\omega c0 = 0.8 \times \omega N$.

Figure 2E:
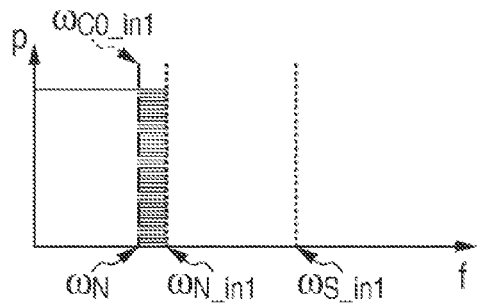

FIG. 2E shows the frequency characteristic obtained when a region of interest is displayed upon reduction in display resolution to 80% that of an input image by performing interpolation/resampling processing after projection transformation processing. The distances between the pixels after projection transformation processing become 80% of the distances between the pixels before projection transformation, and hence each frequency after projection transformation becomes 1.25 times that before projection transformation. Letting $\omega s\_in1$ be the sampling frequency of an image signal in the image region reduced to 80% by projection transformation, $\omega s\_in1 = 1.25 \times \omega s$. Letting $\omega N\_in1$ be the Nyquist frequency of the image signal in the image region reduced to 80% by projection transformation, $\omega N\_in1 = 1.25 \times \omega N$. Letting $\omega c0\_in1$ be the frequency obtained by converting $\omega c0$ in the image region reduced to 80% by projection transformation, $\omega c0\_in1 = 1.25 \times \omega c0 = \omega N$. Since $\omega c0\_in1 = \omega N$, the cutoff frequency in filter processing has become optimal after interpolation/resampling processing.

Figure 2F:
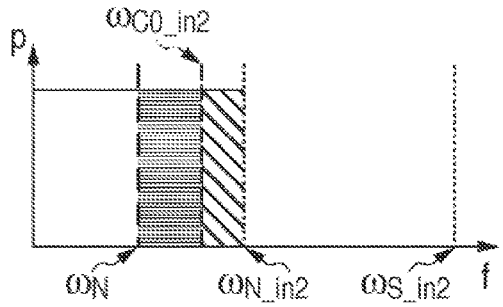

In contrast to this, FIG. 2F shows the frequency characteristic obtained when a region of interest is displayed upon reduction in display resolution to 50% that of an input image by performing interpolation/resampling processing after projection transformation processing. The distances between the pixels after projection transformation become 50% of the distances between the pixels before projection transformation, and hence each frequency characteristic after projection transformation becomes twice that before projection transformation. Letting $\omega s\_in2$ be the sampling frequency of an image signal in the image region reduced to 50% by projection transformation, $\omega s\_in2 = 2 \times \omega s$. Letting $\omega N\_in2$ be the Nyquist frequency of an image signal in the image region reduced to 50% by projection transformation, $\omega N\_in2 = 2 \times \omega N$. Letting $\omega c0\_in2$ be the frequency obtained by converting $\omega c0$ in the image region reduced to 50% by projection transformation, $\omega c0\_in2 = 2 \times \omega c0 \neq \omega N$. That is, since $\omega c0\_in2 \neq \omega N$, the cutoff frequency in filter processing has not become optimal after interpolation/resampling processing. In this case, the image output after interpolation/resampling processing includes folding frequency components in a frequency band higher than $\omega N$, resulting in a deterioration in image quality due to moire or the like.

Although not shown, performing filter processing with the cutoff frequency $\omega c0$ satisfying $\omega c0 = 0.5 \times \omega N$ will obtain $\omega c0\_in2 = 2 \times \omega c0 = \omega N$ with respect to 50% reduction processing. That is, the cutoff frequency $\omega c0$ becomes the optimal cutoff frequency setting for the input image. This obtains $\omega c0\_in2 = 2 \times \omega c0 \neq \omega N$ with respect to 80% reduction processing. That is, the cutoff frequency $\omega c0$ does not become the optimal cutoff frequency setting for the input image. In the image output after interpolation/resampling processing, frequency components in a frequency band lower than $\omega N$ are cut off. This leads to a deterioration in image quality due to blurring or the like.

According to the prior art, since the cutoff frequency $\omega c0$ is fixed, when the reduction ratio varies at each pixel position in an image, optimal filter processing cannot be performed depending on the pixel position. This causes blurring and moire in the image after keystone correction processing, resulting in a deterioration in image quality.

Figure 2G:
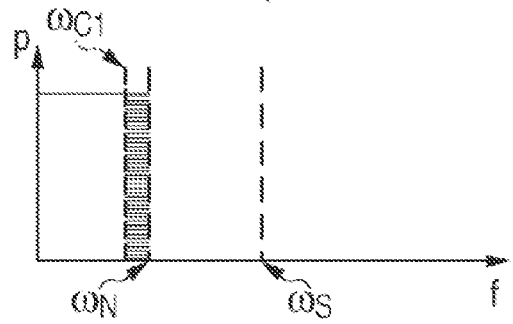
Figure 2H:
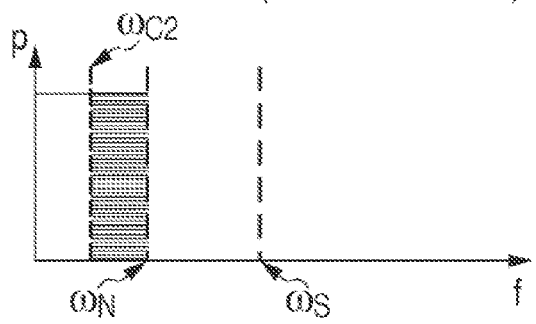

In contrast, in this embodiment, the cutoff frequency at a given pixel position is changed in accordance with the reduction ratio at the pixel position. When filter processing with a cutoff frequency $\omega c1$ is performed for a region of interest having a frequency characteristic like that shown in FIG. 2A, that is, a region with a reduction ratio of 80%, the frequency band from cutoff frequency $\omega c1$ to the Nyquist frequency $\omega N$ is cut off, as shown in FIG. 2G. In this embodiment, the cutoff frequency $\omega c1$ in this case is defined as $\omega c1=0.8\times\omega N$. Likewise, when filter processing with a cutoff frequency $\omega c2$ is performed for a region of interest having a frequency characteristic like that shown in FIG. 2B, that is, a region with a reduction ratio of 50%, the frequency band from cutoff frequency $\omega c2$ to the Nyquist frequency $\omega N$ is cut off, as shown in FIG. 2H. In the embodiment, the cutoff frequency $\omega c2$ in this case is defined as $\omega c2=0.5\times\omega N$. That is, in the embodiment, a cutoff frequency $\omega$ in filter processing for a region with a reduction ratio R (0<R<100) % is set as $\omega=R/100\times\omega N$.

Figure 2I:
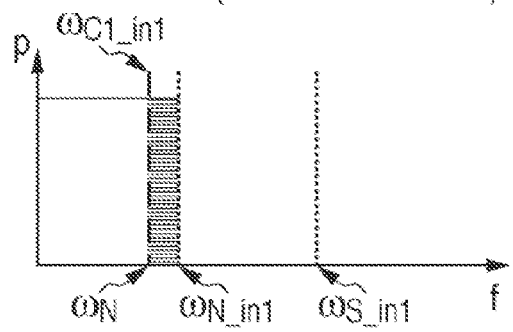

FIG. 2I shows the frequency characteristic obtained when a region of interest is displayed upon reduction in display resolution to 80% that of an input image by performing interpolation/resampling processing after projection transformation processing. The distances between the pixels after projection transformation processing become 80% of the distances between the pixels before projection transformation, and hence each frequency after projection transformation becomes 1.25 times that before projection transformation. Letting $\omega c1\_in1$ be the frequency obtained by converting $\omega c0$ in the image region reduced to 80% by projection transformation, $\omega c1\_in1=1.25\times\omega c0=\omega N$. Since $\omega c0\_in1=\omega N$, the cutoff frequency in filter processing has become optimal after interpolation/resampling processing.

Figure 2J:
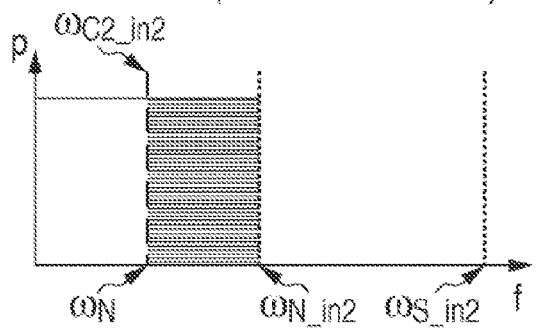

FIG. 2J shows the frequency characteristic obtained when a region of interest is displayed upon reduction in display resolution to 50% that of an input image by performing interpolation/resampling processing after projection transformation processing. The distances between the pixels after projection transformation become 50% of the distances between the pixels before projection transformation, and hence each frequency after projection transformation becomes twice that before projection transformation. Letting $\omega c2\_in2$ be the frequency obtained by converting $\omega c0$ in the image region reduced to 50% by projection transformation, $\omega c2\_in2=2\times\omega c0=\omega N$. Since $\omega c2\_in2=\omega N$, the cutoff frequency in filter processing has optimal after interpolation/resampling processing.

As described above, it is obvious that even if the reduction ratio varies in an image region, since cutoff frequencies are set in accordance with the reduction ratios, optimal filter processing can be implemented. As described above, one feature of this embodiment is that filter processing is performed upon setting of a cutoff frequency corresponding to the reduction ratio at each pixel position. This implements optimal filter processing for an entire image and can perform keystone correction processing without blurring or moire.

Figure 3:
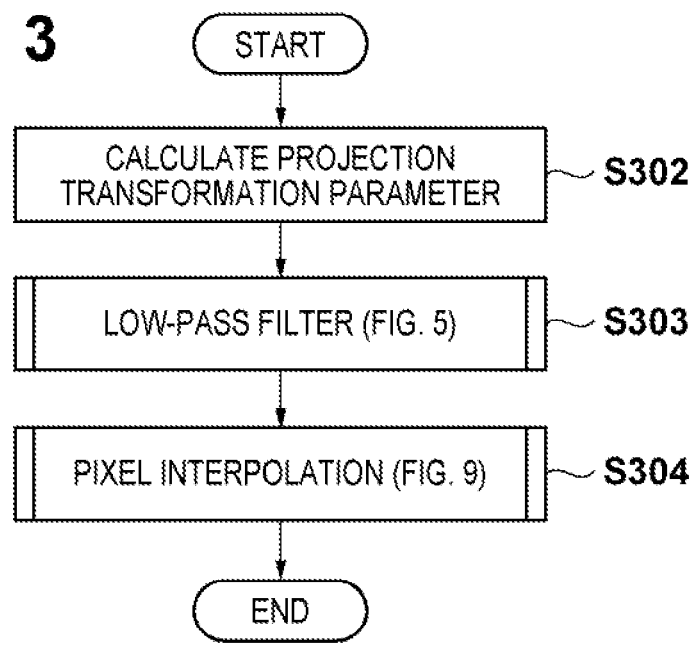
FIG. 3 is a flowchart for the processing performed by the computer 100.

The processing performed by the computer 100 will be described next with reference to FIG. 3 showing a flowchart for the processing. Note that the external storage device 107 stores the computer programs and data for making the CPU 101 execute the processing based on the flowchart of FIG. 3. The CPU 101 loads the computer programs and data from the external storage device 107 into the RAM 103, and executes processing by using the loaded computer programs and data, thereby performing processing in accordance with the flowchart of FIG. 3. That is, the CPU 101 is the subject component of processing in each step based on the flowchart of FIG. 3.

First of all, in step S302, the CPU 101 acquires the four vertex coordinates of a rectangle before projection transformation and the four vertex coordinates of the rectangle after projection transformation. In this step, the CPU 101 may load the respective vertex coordinates stored in the external storage device 107 into the RAM 103, or may store the vertex coordinates input by the user with the input device 105 into the RAM 103. In the step, the CPU 101 further calculates a projection transformation parameter (to be described later) by using these eight vertex coordinates. The processing in the step will be described with reference to the schematic view of projection transformation shown in FIG. 4.

Figure 4:
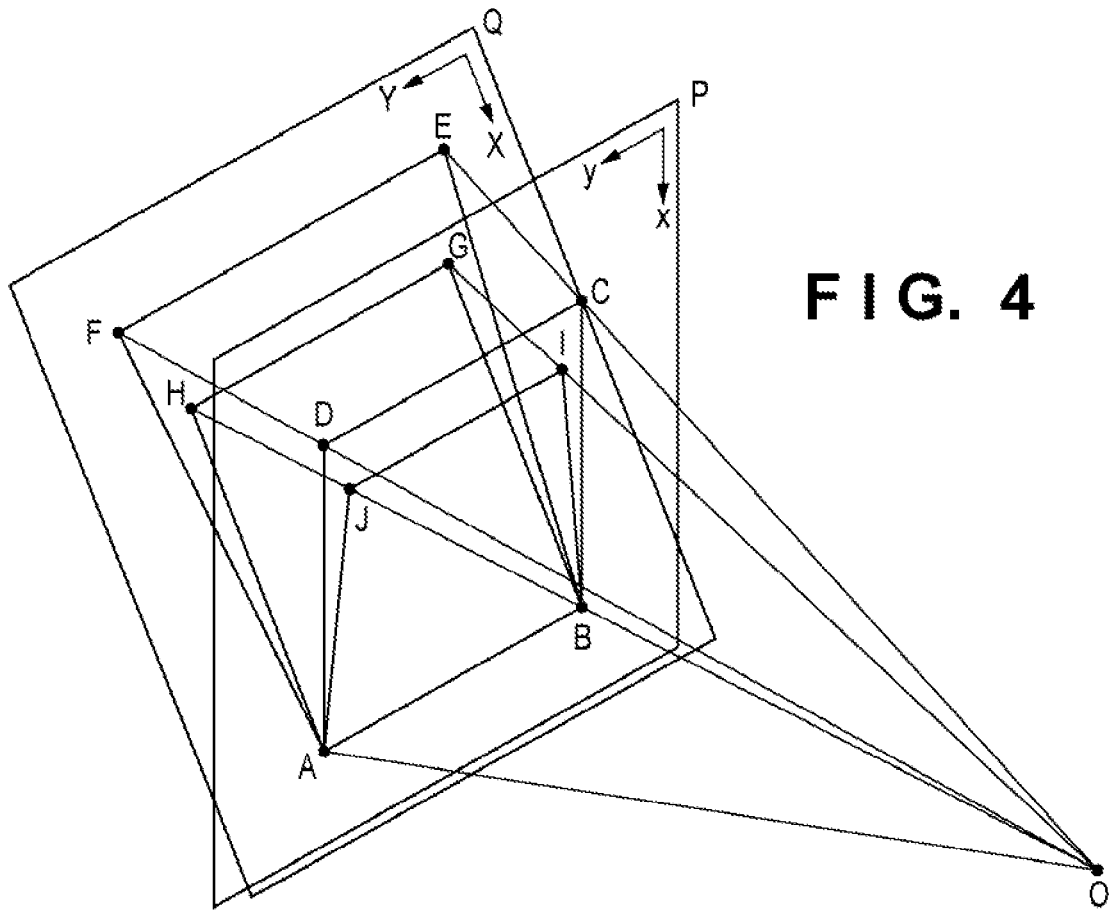
FIG. 4 is a schematic view of projection transformation.

As shown in FIG. 4, projection transformation is the processing of projecting/mapping points on a plane P onto another plane Q with respect to a projection center O. More specifically, letting (x, y) be coordinates on the plane P and (X, Y) be coordinates on the plane Q, projection transformation from the former point to the latter point can be expressed by $$X = \frac{ax+by+c}{gx+hy+i} \qquad (1)$$

$$Y = \frac{dx+ey+f}{gx+hy+i}$$

These equations can be expressed as following by using homogeneous coordinates:

$$H\begin{bmatrix}X\\Y\\1\end{bmatrix} = \begin{bmatrix}a & b & c\\d & e & f\\g & h & i\end{bmatrix}\begin{bmatrix}x\\y\\1\end{bmatrix} \qquad (2)$$

Assume that a projection transformation parameter for transforming the former point into the latter point is M given by $$M = \begin{pmatrix}a & b & c\\d & e & f\\g & h & i\end{pmatrix} \qquad (3)$$

When it is possible to acquire the coordinates of a total of eight vertices of two rectangles as in the case of projection transformation from a rectangle ABCD to a rectangle ABEF in FIG. 4, the projection transformation parameter M can be solved by using the technique being known to those who are skilled in the art.

This embodiment can use any form as long as it is possible to acquire a projection transformation parameter which allows transformation from a point before projection transformation to a point after projection transformation. Assume that in the following description, a coordinate system before projection transformation is the plane P, and a coordinate system after projection transformation is the plane Q.

Referring to FIG. 4, the rectangle ABCD represents an image located on the plane P before mapping, and the rectangle ABEF represents an image obtained by projection transformation of the image on the plane P onto the plane Q. A rectangle ABGH is a rectangle on the plane Q which has a shape similar to that of the rectangle ABCD (ABCD is similar figure to ABGH). A rectangle ABIJ represents an image obtained by projection transformation of the image represented by the rectangle ABGH onto the plane P.

Assume that in this embodiment, vertices A, B, E, and F of the rectangle ABEF and vertices A, B, G, and H of the rectangle ABGH may be set at arbitrary coordinate positions.

In step S302, the CPU 101 obtains an inverse projection transformation parameter $M^{-1}$ representing projection transformation (projection transformation of plane P→plane Q) inverse to projection transformation (projection transformation of plane P→plane Q) represented by the projection transformation parameter M.

$M^{-1}$ represents a matrix inverse to that represented by M. Therefore, the projection transformation parameter M and the inverse projection transformation parameter $M^{-1}$ have a relationship represented by $$M = (M^{-1})^{-1} \quad (4)$$

Note that it is possible to perform projection transformation from the plane Q to the plane P by using the following equations obtained by substituting outputs (X, Y) for inputs (x, y) in equations (1).

$$x = \frac{a'X + b'Y + c'}{g'X + h'Y + i'} \quad (5)$$

$$y = \frac{d'X + e'Y + f'}{g'X + h'Y + i'}$$

These equations can be expressed as following by using homogeneous coordinates:

$$H\begin{bmatrix} x \\ y \\ 1 \end{bmatrix} = \begin{bmatrix} a' & b' & c' \\ d' & e' & f' \\ g' & h' & i' \end{bmatrix} \begin{bmatrix} X \\ Y \\ 1 \end{bmatrix} \quad (6)$$

Note that the inverse projection transformation parameter $M^{-1}$ is represented by $$M^{-1} = \begin{pmatrix} a' & b' & c' \\ d' & e' & f' \\ g' & h' & i' \end{pmatrix} \quad (7)$$

Figure 5:
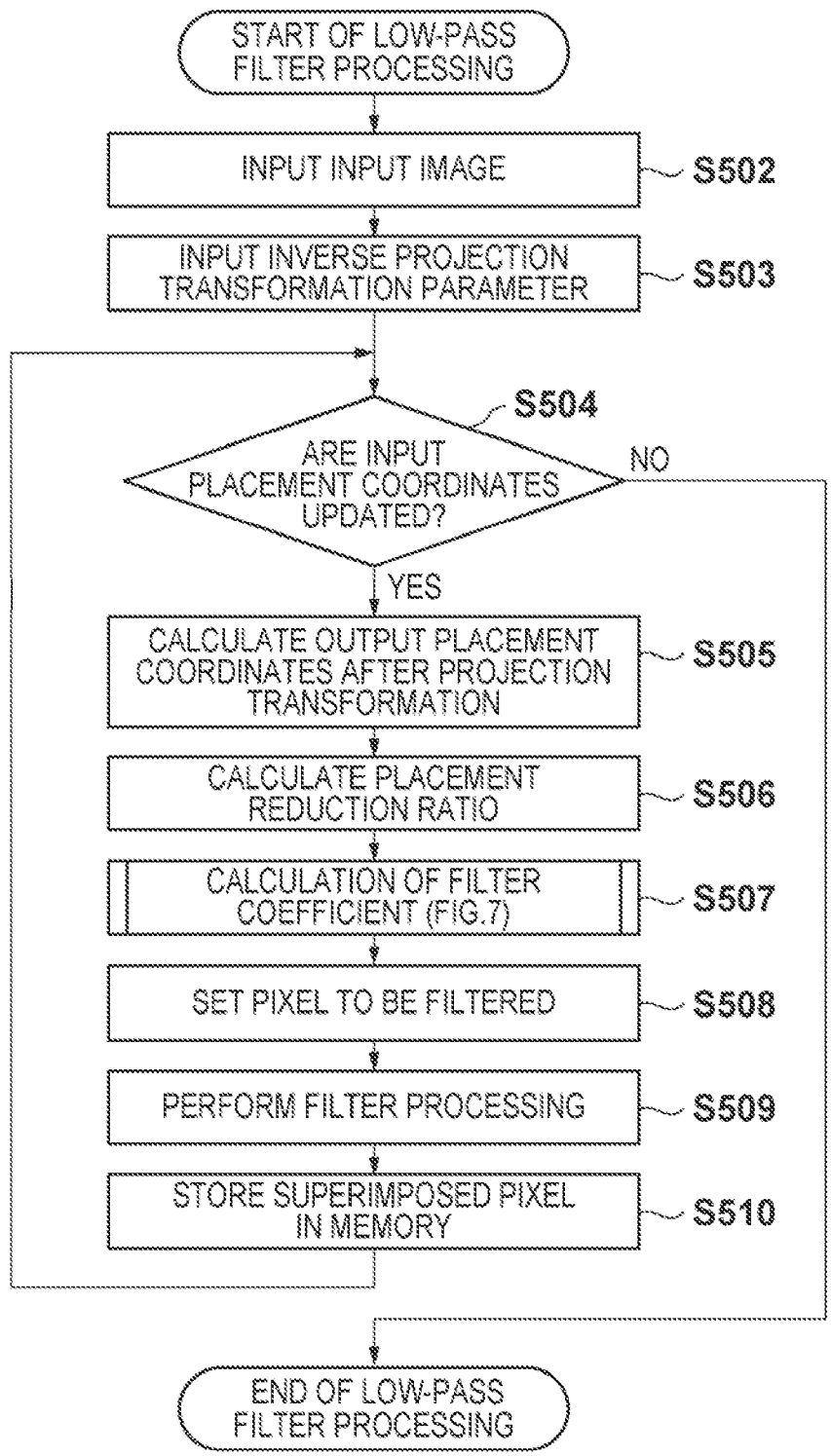
FIG. 5 is a flowchart for processing in step S303.

In step S303, the CPU 101 loads the input image as a projection transformation source from the external storage device 107 or the like into the RAM 103, and performs low-pass filter processing for the input image. The processing in step S303 will be described with reference to the flowchart of FIG. 5 showing the details of the processing.

In step S502, the CPU 101 acquires an input image in the RAM 103. The form of acquisition to be used is not specifically limited. It is possible to load an input image from the external storage device 107 into the RAM 103 or download it from an external apparatus to the RAM 103 via the network I/F 104.

In step S503, the CPU 101 acquires the inverse projection transformation parameter $M^{-1}$ obtained in step S302 in the RAM 103. In step S504, when placing the input image on the plane Q, the CPU 101 updates variables X and Y representing a pixel position (=coordinate position on plane Q) on the input image. The initial values of the variables X and Y are 0. The process advances to step S505 after incrementing the value of the variable X by one unless the value of the variable X has not reached x_max (the number of pixels in the X direction (the direction along one side of the input image) at the display resolution of the input image) in step S504. In contrast, if the value of the variable X reaches x_max, the process advances to step S505 upon initializing the value of the variable X to 0 and incrementing the value of the variable Y by one. If the value of the variable Y reaches y_max (the number of pixels in the Y direction at the display resolution of the input image), the CPU 101 terminates the processing based on the flowchart of FIG. 5.

In step S505, the CPU 101 performs inverse projection transformation of the coordinate position (X, Y) on the plane Q by performing calculation based on the following equation using the inverse projection transformation parameter $M^{-1}$, thereby obtaining the corresponding coordinate position (x, y) on the plane P.

$$H\begin{pmatrix} x \\ y \\ 1 \end{pmatrix} = M^{-1} \begin{pmatrix} X \\ Y \\ 1 \end{pmatrix} \quad (8)$$

Note that in this step, the CPU 101 performs similar inverse projection transformation of coordinate positions around the coordinate position (X, Y) on the plane Q to obtain the corresponding coordinate positions on the plane P in advance for the subsequent processing. More specifically, the CPU 101 performs the above inverse projection transformation for coordinate positions (X+1, Y) and (X, Y+1) on the plane Q by using the inverse projection transformation parameter $M^{-1}$ to obtain the corresponding coordinate position (x, y) on the plane P. Note that there is no need to obtain again the coordinate positions (X−1, Y) and (X, Y−1) on the plane Q because the corresponding coordinate position (x, y) has already been obtained.

In step S506, the CPU 101 obtains the ratio between the distance between the pixels around the coordinate position (x, y) on the plane P and the distance between the pixels around the coordinate position (X, Y) on the plane Q as a reduction ratio at the coordinate position (X, Y) on the plane Q (first calculation). The processing in step S506 will be described with reference to FIG. 6 showing pixels around the coordinate position (x, y) on the plane P and pixels around the coordinate position (X, Y) on the plane Q.

Figure 6:
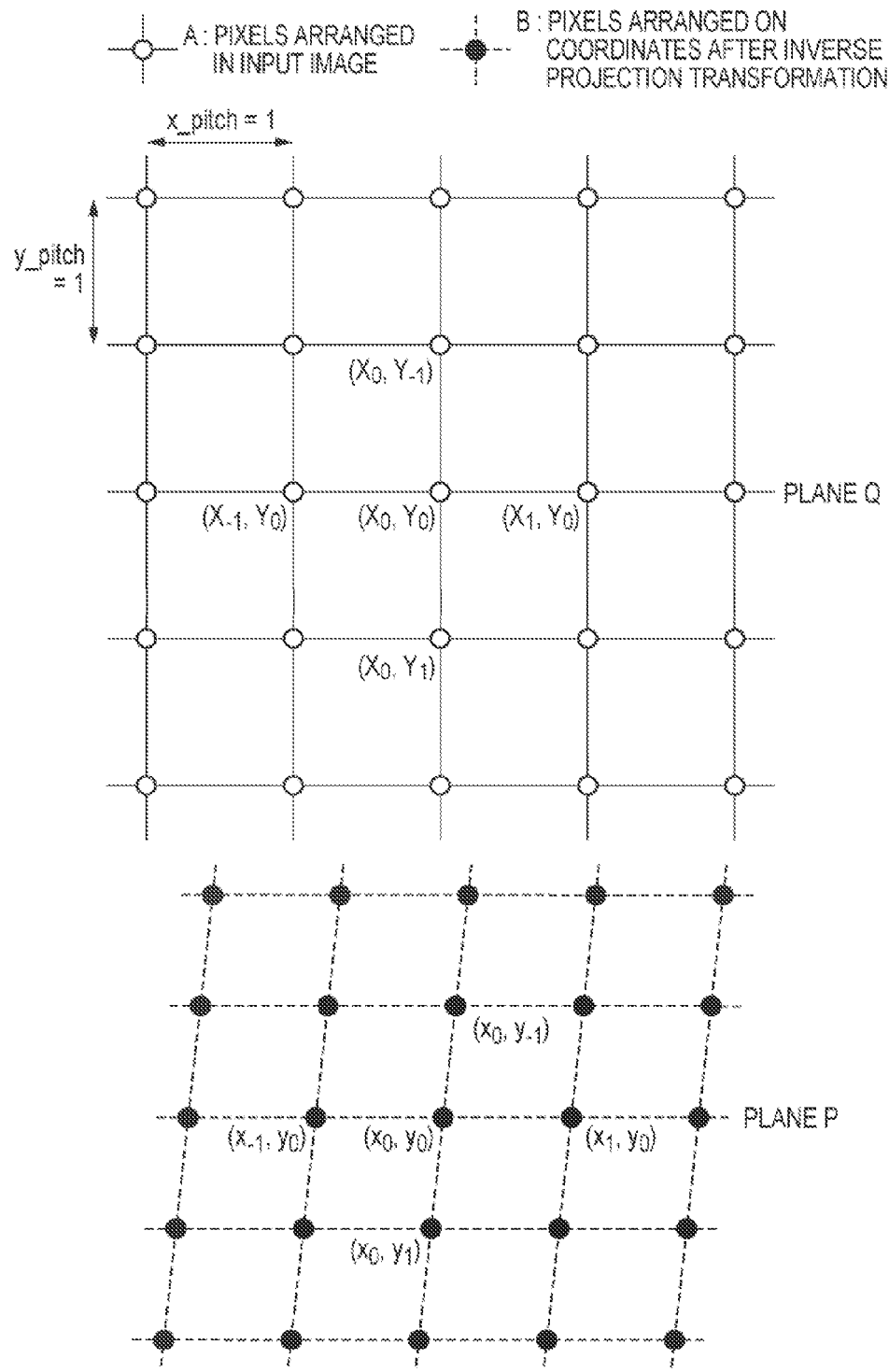
FIG. 6 is a flowchart for processing in step S506.

The upper part of FIG. 6 shows the pixel positions of pixels (the respective pixels constituting the input image) arranged in a lattice form on the plane Q. Let x_pitch be the distance between pixel positions in the X direction, and y_pitch be the distance between pixel positions in the Y direction. In this case, for simplification of calculation, x_pitch=y_pitch=1.

The lower part of FIG. 6 shows the respective pixel positions obtained by inverse projection transformation of the pixel positions of the pixels arranged in a lattice form on the plane Q onto the plane P. The distances between the pixel positions on the plane P are smaller than those on the plane Q.

In this case, the CPU 101 obtains a reduction ratio $xo_{0\_0}$ in the X direction and a reduction ratio $yo_{0\_0}$ in the Y direction at a coordinate position $(X_0, Y_0)$ on the plane Q by calculating the following equations:

$$xo_{0\_0} = \frac{|x_{-1} - x_1|}{2 \cdot \text{x\_pitch}} \quad (9)$$

$$yo_{0\_0} = \frac{|y_{-1} - y_1|}{2 \cdot y\_pitch} \quad (10)$$

In this case, $(x_{-1}, y_0)$ indicates a coordinate position on the immediate left side of $(x_0, y_0)$, and $(x_1, y_0)$ indicates a coordinate position on the immediate right side of $(x_0, y_0)$. In addition, $(x_0, y_{-1})$ indicates a coordinate position on the immediate upper side of $(x_0, y_0)$, and $(x_0, y_1)$ indicates a coordinate position on the immediate lower side of $(x_0, y_0)$.

Note that it is possible to calculate the reduction ratio $xo_{0\_0}$ in the X direction and the reduction ratio $yo_{0\_0}$ in the Y direction by using equations (11) and (12) instead of equations (9) and (10).

$$xo_{0\_0} = |x_0 - x_{-1}| \quad (11)$$

$$yo_{0\_0} = |y_0 - y_{-1}| \quad (12)$$

It is possible to use any equations and perform any calculations as long as a reduction ratio can be obtained in the following manner. Assume that when an inverse projection image is generated by performing inverse projection transformation of an input image by using an inverse matrix of a preset projection transformation matrix (projection transformation for the enlargement of the size of the input image), the position of a pixel of interest on the input image is transformed into the position of an inverse pixel projection pixel of interest on the inverse projection image by inverse projection transformation. In this case, the CPU 101 obtains, as a reduction ratio, the ratio of the distance between pixels around the position of the inverse projection pixel of interest to the distance between pixels around the position of the pixel of interest.

Figure 7:
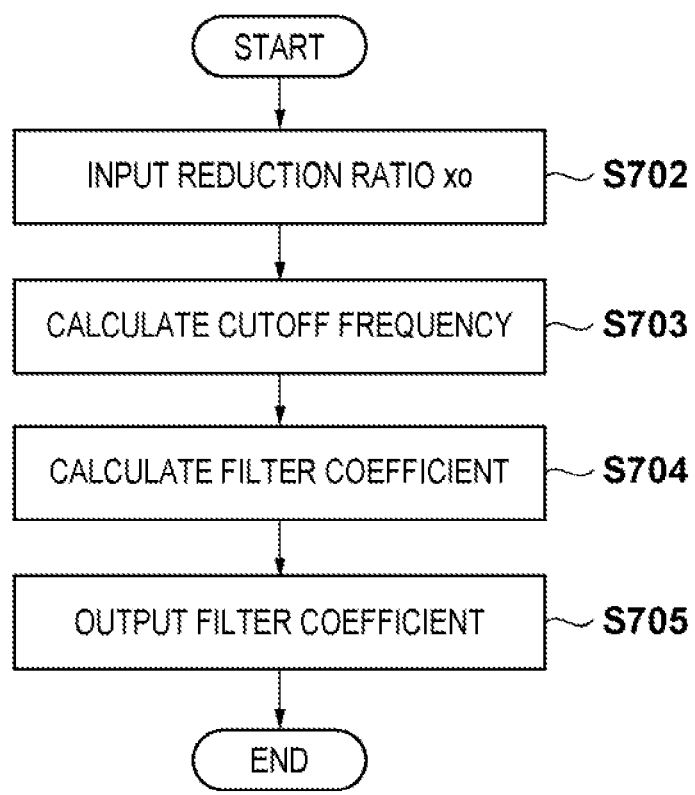
FIG. 7 is a flowchart for processing in step S507.

In step S507, the CPU 101 obtains a filter coefficient for the coordinate position (X, Y) by using the reduction ratio obtained with respect to the coordinate position (X, Y). The processing in step S507 will be described with reference to the flowchart of FIG. 7 showing the details of the processing.

In step S702, the CPU 101 acquires a reduction ratio $xo_{x\_y}$ obtained for the coordinate position (X, Y) in step S506 in the RAM 103. In step S703, the CPU 101 obtains a cutoff frequency $\omega c\_Y\_X$ of a filter for the coordinate position (X, Y) by calculating the following equation by using the reduction ratio $xo_{x\_y}$.

$$\omega_{C\_X\_Y} = \omega_N \cdot xo_{X\_Y} \quad (13)$$

That is, the CPU 101 obtains the product of the Nyquist frequency $\omega N$ of the input image and the reduction ratio $xo_{x\_y}$ as the cutoff frequency $\omega c\_Y\_X$ by calculation based on this equation (second calculation). In step S704, the CPU 101 calculates filter coefficients for a low-pass filter using the obtained frequency $\omega c\_Y\_X$ as a cutoff frequency. The processing in step S704 will be described with reference to FIGS. 8A and 8B.

Figure 8A:
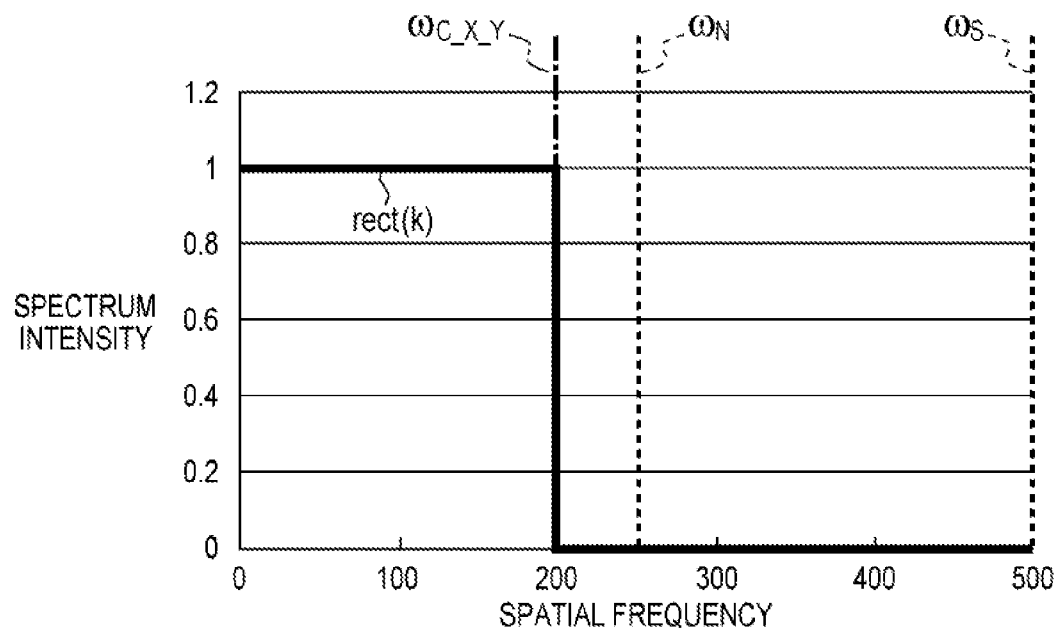
FIGS. 8A and 8B are graphs for explaining processing in step S704.

FIG. 8A shows a square waveform defined by using the cutoff frequency $\omega c\_Y\_X$ in a frequency space. Letting N be the period length of an image signal, N=500 in this embodiment. The sampling frequency $\omega s$ and Nyquist frequency $\omega N$ of the image signal in the frequency space respectively correspond to N and N/2. In addition, the cutoff frequency $\omega c\_Y\_X$ of the filter corresponds to $$\frac{Nx_{xo_{x\_y}}}{2}.$$

In this embodiment, $xo_{x\_y}=0.8$, $\omega N=250$, and $\omega c\_X\_Y=200$.

When calculating filter coefficients, the CPU 101 calculates a function (square waveform) represented by the following equation in the frequency space. In this case, k represents a spatial frequency in the frequency space.

$$rect(k) = \begin{cases} 1 & 0 \le k \le \omega_{C\_X\_Y} \\ 0 & \omega_{C\_X\_Y} < k \end{cases} \quad (14)$$

The CPU 101 then performs inverse Fourier series expansion of a rect(k) function to transform it into a sin c(n) function in a real space. In this case, n represents a pixel position in the real space. The value of this sin c(n) function is used as a filter coefficient.

A function xn in the real space is transformed into a function Xk in the frequency space by discrete Fourier series expansion represented by equation (15):

$$X_k = \sum_{n=0}^{N-1} x_n \cos\left(\frac{2\pi kn}{N}\right) - j\sum_{n=0}^{N-1} x_n \sin\left(\frac{2\pi kn}{N}\right) \quad (15)$$

In addition, the function Xk is transformed into the function xn by discrete inverse Fourier series expansion represented by equation (16):

$$x_n = \frac{1}{N}\left\{\sum_{k=0}^{N-1} X_k \cos\left(\frac{2\pi kn}{N}\right) + j\sum_{k=0}^{N-1} X_k \sin\left(\frac{2\pi kn}{N}\right)\right\} \quad (16)$$

In this embodiment, the rect(K) function is transformed into the sin c(n) in the real space by using discrete inverse Fourier series expansion represented by equation (17):

$$\sin c(n) = \frac{1}{N}\left\{\sum_{n=0}^{N-1} rect(k)\cos\left(\frac{2\pi kn}{N}\right) + j\sum_{n=0}^{N-1} rect(k)\sin\left(\frac{2\pi kn}{N}\right)\right\} \quad (17)$$

Note that in this embodiment, all the imaginary parts of the rect(k) function are set to 0. This makes it possible to also calculate the sin c(n) function, which uses the discrete inverse Fourier series expansion represented by equation (17), by using discrete inverse Fourier series expansion represented by equation (18) given below:

$$\sin c(n) = \frac{1}{N}\sum_{n=0}^{N-1} rect(k)\cos\left(\frac{2\pi kn}{N}\right) \quad (18)$$

Figure 8B:
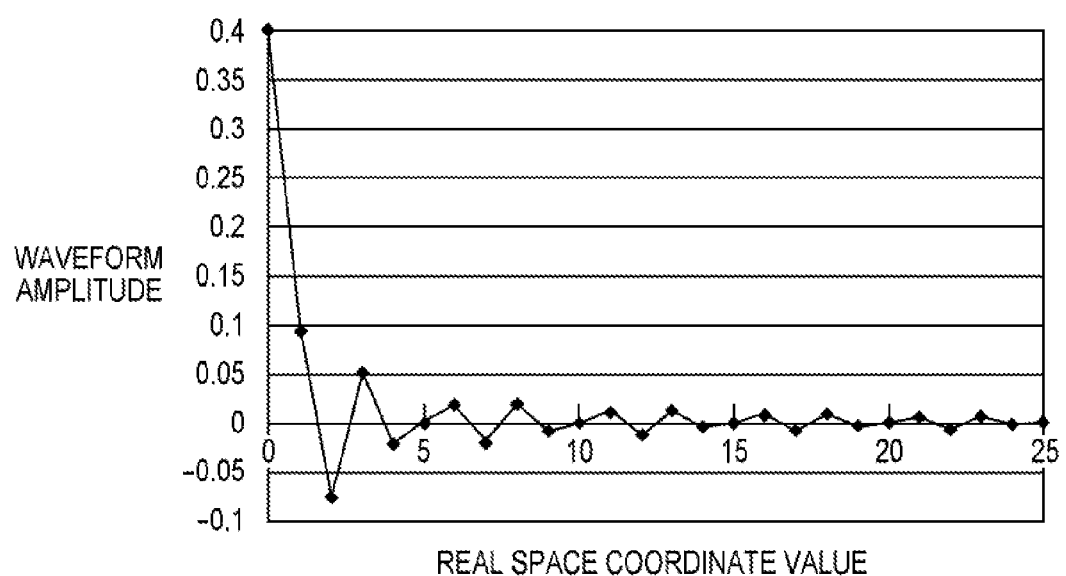

FIG. 8B shows an example of how the rect(k) function shown in FIG. 8A is transformed into the sin c(n) function by using equation (18). The abscissa represents the coordinates of pixels in the real space, and the ordinates represents the amplitude of the sin c(n) function. FIG. 8B shows the interval $0 \le n \le 25$ of the sin c(n) function.

Since the sin c(n) function is of non-compact support (non-zero values are not limited to a finite interval), the range value of the interval of the filter is represented by p, where p is a natural number satisfying $1 \leq p \leq N$. In addition, the range n of the filter satisfies $-p \leq n \leq p$. When the range is set to p, the filter coefficients are normalized such that they sum up to 1. Filter coefficients filter_coef$_n$ are normalized by $$\text{filter\_coef}_n = \frac{\sin c(n)}{\sum_{m=-p}^{p} \sin c(m)} \quad (19)$$

In step S705, the CPU 101 outputs the filter coefficients filter_coef$_n$ calculated in this manner to the RAM 103. In the processing in step S507, if the interval of filter_coef$_n$ is determined, the values of filter_coef$_n$ are uniquely determined by the values of the reduction ratios xo$_{x\_y}$ in the x direction. A lookup table may be generated in advance, in which the filter coefficients filter_coef$_n$ are registered in correspondence with the respective reduction ratios. In step S507, it is possible to acquire the filter coefficient filter_coef$_n$ corresponding to the reduction ratio xo$_{x\_y}$ at the coordinate position (X, Y) from this lookup table.

Referring back to FIG. 5, in step S508, the CPU 101 sets a pixel array including the pixel position (X, Y) in the input image as a pixel array to be subjected to filter processing. When the range n of the filter coefficients filter_coef$_n$ satisfies $-p \leq n \leq p$, (2p+1) pixel arrays including the pixel position (X, Y) in the input image are set as pixel arrays to be subjected to filter processing. That is, the CPU 101 sets, as pixel arrays to be subjected to filter processing, (2P+1) pixel arrays including p pixel arrays arranged on the right side of the pixel position (X, Y), the pixel at the pixel position (X, Y), and p pixel arrays arranged on the left side of the pixel position (X, Y). Obviously, the pixel array setting method to be used is not limited to this.

In this case, a pixel value lpf_input$_n$ of the nth pixel from the left of the set pixel array satisfies $$lpf\_input_n = PIXEL(X-p+n, Y) \quad (20)$$

In this case, PIXEL(X−p+n, Y) represents a pixel value at a pixel position (X−p+n, Y) in the input image. In step S509, the CPU 101 performs low-pass filter processing for the set pixel array by calculating the following equation, and obtains a low-pass filter processing result output1 as a pixel value at the pixel position (X, Y) in the image having undergone the filter processing.

$$\text{output1} = \sum_{n=0}^{2p+1} lpf\_input_n \times \text{filter\_coef}_n \quad (21)$$

The processing based on this equation is the processing of obtaining the sum of the results obtained by multiplying the pixel values of the respective pixels in the pixel array including the position of the pixel of interest in the input image by the respective filter coefficients of the low-pass filter as a pixel value at the position of the pixel of interest in the image having undergone the filter processing.

In step S510, the CPU 101 stores, in the RAM 103, output1 obtained in step S509 as a pixel value at the pixel position (X, Y) in the image having undergone the filter processing. The process returns to step S504.

Performing the above processing (in steps S505 to S510) for all the pixel positions can determine pixel positions at the respective pixels constituting the image having undergone the filter processing.

The above description has exemplified one-dimensional filter processing on the X-axis by using the reduction ratios obtained in the X direction. However, it is possible to perform two-dimensional filter processing in an X-Y plane by performing one-dimensional filter processing on the Y-axis by using reduction ratios in the Y direction following above filter processing. That is, the essence of this embodiment imposes no limitation on the dimension of filter processing.

Figure 9:
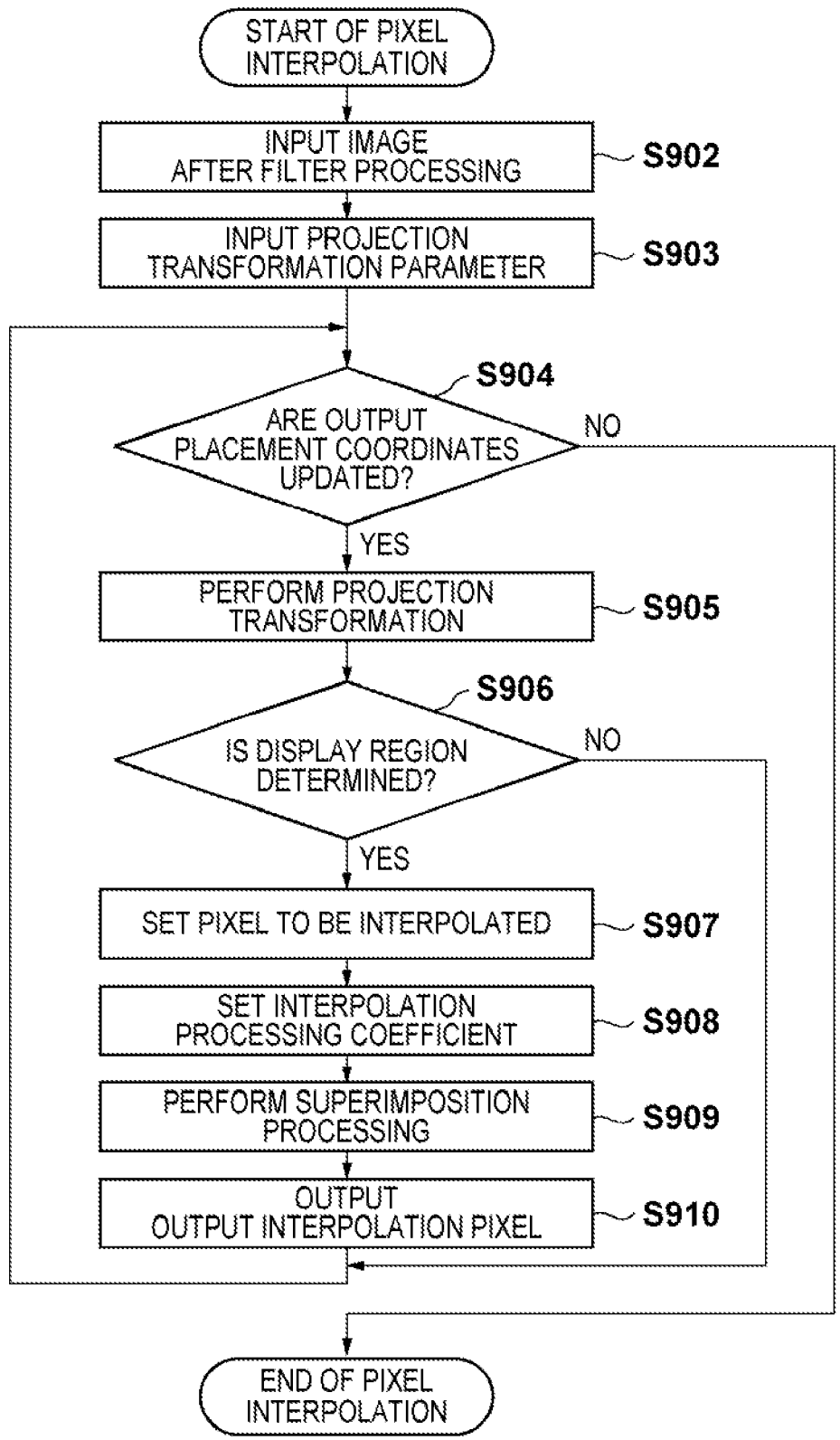
FIG. 9 is a flowchart for processing in step S304.

Referring back to FIG. 3, in step S304, the CPU 101 performs pixel interpolation processing for the image having undergone the filter processing, whose pixel values have been determined by the above processing. The processing in step S304 will be described with reference to the flowchart of FIG. 9 showing the details of the processing.

First of all, in step S902, the CPU 101 acquires the image having undergone the filter processing, which has been obtained by the previous processing, in the RAM 103. In step S903, the CPU 101 acquires the projection transformation parameter M obtained in step S302 in the RAM 103.

In step S904, when placing the image having undergone the filter processing on the plane P, the CPU 101 updates variables x and y indicating a pixel position (=coordinate position on plane P) on the image having undergone the filter processing. The initial values of the variables x and y are 0. In this step, the CPU 101 increments the value of the variable x by one unless the value of the variable x has reached x_max (the number of pixels of the image having undergone the filter processing in the X direction at the display resolution). The process then advances to step S905. If the value of the variable x has reached x_max, the CPU 101 initializes the value of the variable x to 0, and increments the value of the variable y by one. The process then advances to step S905. If the value of the variable y has reached y_max (the number of pixels of the image having undergone the filter processing in the Y direction at the display resolution), the CPU 101 terminates the processing based on the flowchart of FIG. 9.

In step S905, the CPU 101 performs projection transformation of the coordinate position (x, y) on the plane P by performing calculation based on the following equation using the projection transformation parameter M, thereby obtaining the corresponding coordinate position (X, Y) on the plane Q.

$$H \begin{pmatrix} X \\ Y \\ 1 \end{pmatrix} = M \begin{pmatrix} x \\ y \\ 1 \end{pmatrix} \quad (22)$$

In step S906, the CPU 101 determines whether the pixel position (X, Y) obtained by projection transformation in step S905 falls within the rectangle ABGH (FIG. 4) on the plane Q. In this embodiment, since the rectangle ABGH is congruent to the rectangle ABCD, the CPU 101 may determine in step S906 whether the pixel position satisfies the conditions of 0<X<x_max and 0<Y<y_max.

If this determination result indicates that the pixel position satisfies the conditions, the process advances to step S907. If the pixel position does not satisfy the conditions, the process returns to step S904. In step S907, the CPU 101 sets pixels used to decide a pixel value at the pixel position (X, Y) in an output image. The processing in step S907 will be described with reference to FIG. 10.

Figure 10:
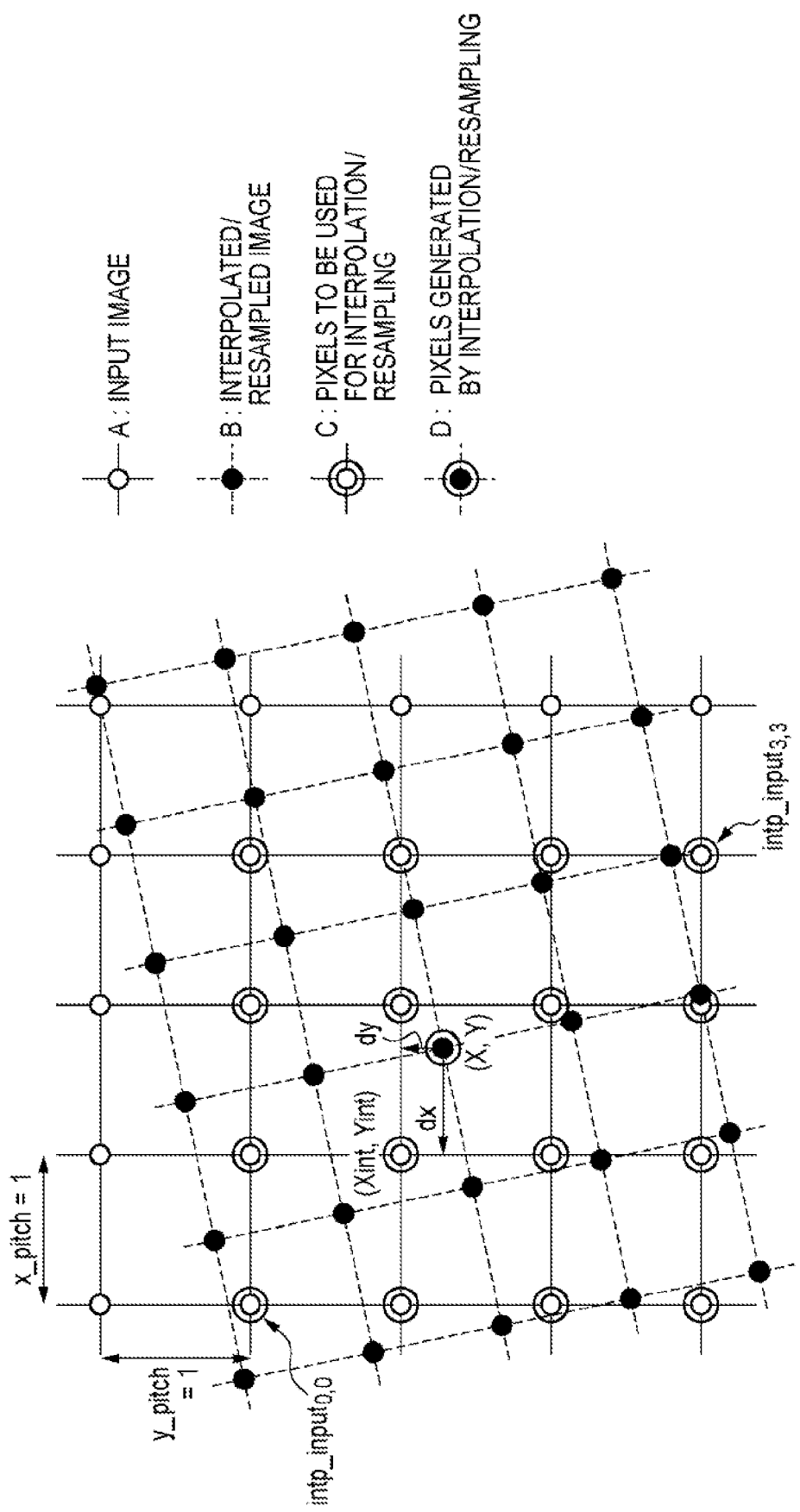
FIG. 10 is a view for explaining processing in step S907.

FIG. 10 shows "A: input image (image having undergone filter processing)" mapped on the plane P and "B: interpolated/resampled image (output image)" mapped on the plane Q. Of the pixels constituting "B: interpolated/resampled image", "D: pixel generated by interpolation/resampling" located at the pixel position (X, Y) is a pixel for deciding a pixel value. To interpolate/resample this pixel value, the CPU 101 selects "C: pixels used for interpolation/resampling" around the pixel position (X, Y).

Assume that in this embodiment, variables m and n to be used in the following description respectively satisfy $0 \leq m \leq 3$ and $0 \leq n \leq 3$. The embodiment decides pixels to be referred to in an image having undergone filter processing, in order to decide a pixel value at the pixel position (X, Y) in an output image.

$$int\, p\_input_{m,n} = \text{PIXEL}(X\,int-1+m, Y\,int-1+n) \quad (23)$$

In this case, X int=floor(X, 1) and Y int=floor(Y, 1), and q=floor(p, 1) is a function for returning an integral value q obtained by discarding the decimal part of p. In addition, PIXEL(X int−1+m, Y Int−1+n) represents a pixel value at a pixel position (X int−1+m, Y Int−1+n) in the image having undergone filter processing.

In step S908, the CPU 101 obtains a weight value int p_coef$_{mn}$ for a pixel value int p_input$_{mn}$ according to the following equation:

$$int\, p\_coef_{m,n} = f(abs(m-1-dx), abs(n-1-dy)) \quad (24)$$

In this case, dx=X−X int and dy=Y−Y int, and q=abs(p) is a function for returning an absolute value q of p. In addition, r=f(p, q) is a two-dimensional interpolation function, as which a two-dimensional bicubic interpolation function, a two-dimensional binary function, a two-dimensional Lanczos interpolation function, or the like can be used. When the two-dimensional bicubic interpolation function is to be used, r=f(p, q) is expressed by $$f(abs(m-1-dx), abs(n-1-dy)) = g(abs(m-1-dx)) \times g(abs(n-1-dy)) \quad (25)$$

where g(x) is a one-dimensional bicubic interpolation function, which is based on $$g(x) = \begin{cases} (2+a)x^3 - (3+a)x^2 + 1 & 0 \leq x \leq 1 \\ ax^3 - 5ax^2 + 8ax - 4a & 1 < x \leq 2 \end{cases} \quad (26)$$

where a is an interpolation processing coefficient, which generally satisfies $-2.0 \leq a \leq 0.0$. In step S909, the CPU 101 sums up the multiplication results obtained by multiplying the pixel values of the respective pixels in the pixels set in step S907 by corresponding weight values int p_coef$_{mn}$, and sets the sum as a pixel value at the pixel position (X, Y) in the output image. This processing is performed according to $$output2 = \sum_{m=0}^{3} \sum_{n=0}^{3} intp\_input_{m,n} \times intp\_coef_{m,n} \quad (27)$$

In step S910, the CPU 101 stores output2 obtained in step S909, as a pixel value at the pixel position (X, Y) in the output image, in the RAM 103. The process then returns to step S904.

According to the above description, this embodiment can control a filter coefficient for a pixel of interest in accordance with the reduction ratios between pixels by projection transformation, and hence can perform proper image processing in keystone correction processing.

[Second Embodiment]

Figure 11:
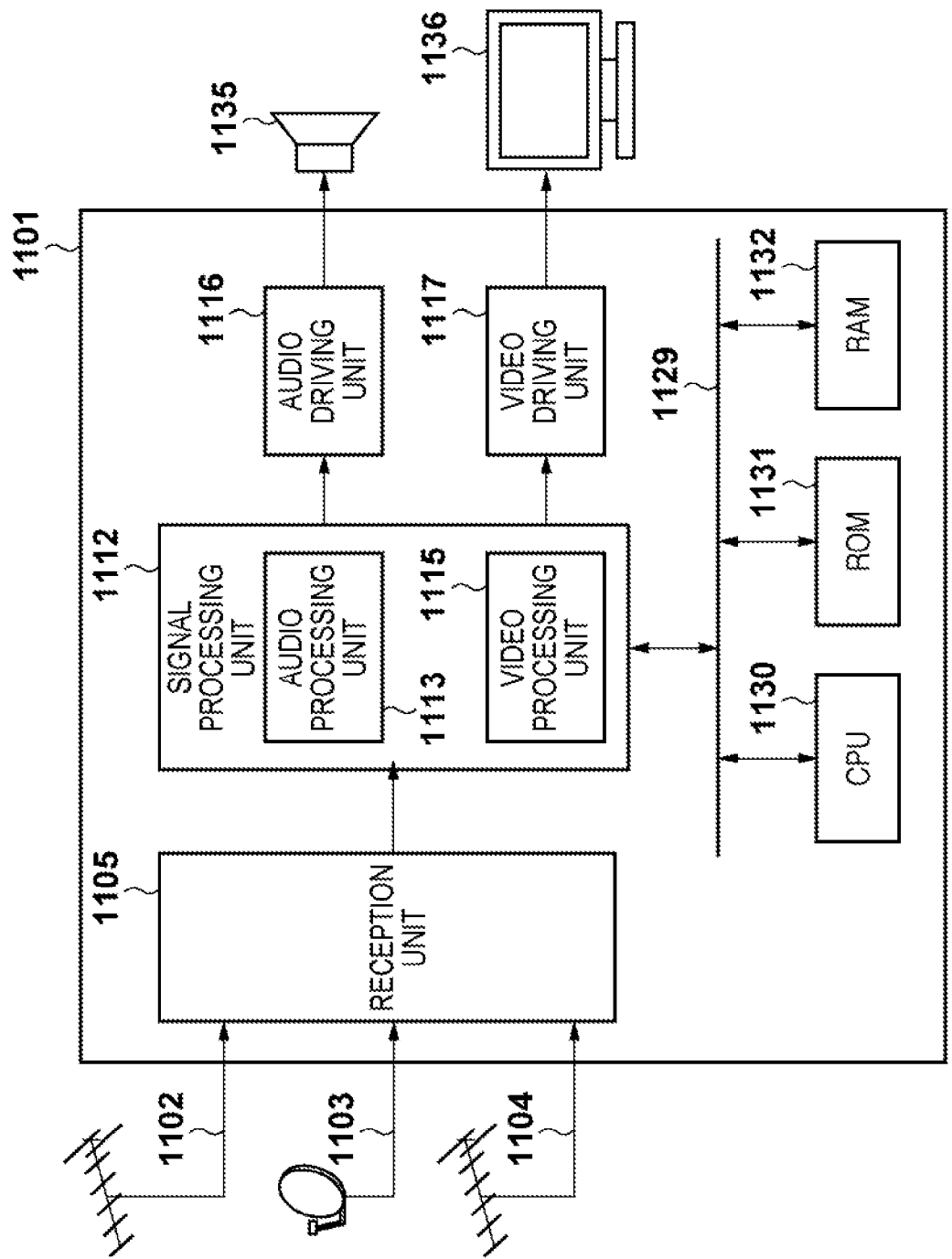
FIG. 11 is a block diagram showing an example of the hardware arrangement of a projector apparatus 1101.

This embodiment will exemplify a projector apparatus which performs processing similar to that performed by the computer 100 described in the first embodiment. An example of the hardware arrangement of a projector apparatus 1101 according to this embodiment will be described with reference to the block diagram of FIG. 11.

A reception unit 1105 receives broadcast waves via antennas 1102, 1103, and 1104, and decodes them into audio and video signals. An I/F unit (not shown) interfaces various kinds of input/output control signals for channel selection, volume control, and image quality correction.

An audio processing unit 1113 in a signal processing unit 1112 properly processes an audio signal from the reception unit 1105, and outputs the resultant signal to an audio driving unit 1116. A video processing unit 1115 in the signal processing unit 1112 performs various kinds of processes (to be described later) for a video signal from the reception unit 1105, and outputs the resultant signal to a video driving unit 1117.

The audio driving unit 1116 causes a speaker 1135 to output the sound based on an audio signal from the audio processing unit 1113. The video driving unit 1117 causes a panel 1136 to display the video based on a video signal from the video processing unit 1115.

A CPU 1130 controls the overall operation of the projector apparatus 1101 by using computer programs and data stored in a ROM 1131 and a RAM 1132. The ROM 1131 stores set data in this apparatus and computer programs and data to be used by the CPU 1130 to control various kinds of operations. The RAM 1132 provides various kinds of areas, as needed. The CPU 1130, the ROM 1131, the RAM 1132, and the signal processing unit 1112 are connected to each other via a common bus 1129.

Figure 12:
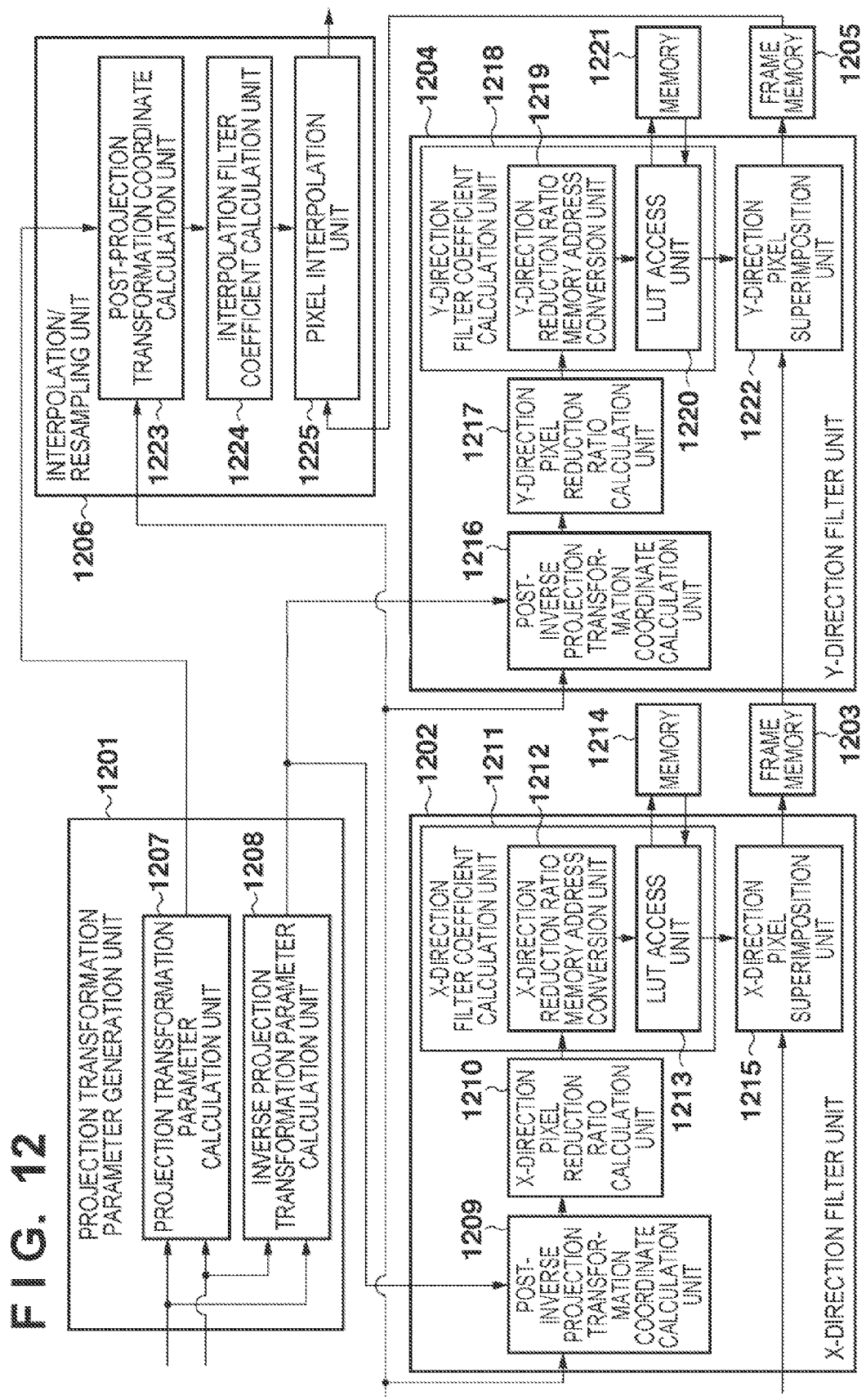
FIG. 12 is a block diagram showing an example of the functional arrangement inside a video processing unit 1115.

An example of the functional arrangement inside the video processing unit 1115 will be described with reference to the block diagram of FIG. 12. Part or all of the arrangement shown in FIG. 12 may be implemented by hardware or software.

A projection transformation parameter calculation unit 1207 in a projection transformation parameter generation unit 1201 receives the above eight vertex coordinates, and obtains the above projection transformation parameter by using the received coordinates in the same manner as in the first embodiment. An inverse projection transformation parameter calculation unit 1208 in the projection transformation parameter generation unit 1201 obtains the above inverse projection transformation parameter by using the above projection transformation parameter in the same manner as in the first embodiment.

An X-direction filter unit 1202 performs filter processing for each pixel by using a filter coefficient corresponding to each pixel position in an input image, thereby generating an image having undergone low-pass filter in the X direction.

A post-inverse projection transformation coordinate calculation unit 1209 performs inverse projection transformation of a coordinate position (X, Y) on a plane Q by performing calculation using an inverse projection transformation parameter M$^{-1}$ according to equation (8) given above, and then obtains a corresponding coordinate position (x, y) on a plane P.

An X-direction pixel reduction ratio calculation unit 1210 calculates a reduction ratio xo$_{0\_0}$ in the X direction in the same manner as in the first embodiment. Obviously, in this embodiment as well, the method of obtaining the reduction ratio $xo_{0\_0}$ in the X direction is not limited to one method, and various other methods are conceivable.

An X-direction filter coefficient calculation unit 1211 obtains a filter coefficient from the reduction ratio $xo_{0\_0}$ in the same manner as in the first embodiment. An X-direction reduction ratio memory address conversion unit 1212 generates an address for reading out a filter coefficient corresponding to the reduction ratio $xo_{0\_0}$ calculated by the X-direction pixel reduction ratio calculation unit 1210 from a lookup table in which filter coefficients are registered in correspondence with reduction ratios. This lookup table is stored in a memory 1214.

A LUT access unit 1213 accesses the address generated by the X-direction reduction ratio memory address conversion unit 1212 in the lookup table stored in the memory 1214 to read out the filter coefficient registered at the address.

Note that the method of acquiring a filter coefficient is not limited to this. It is possible to calculate filter coefficients by performing the processing based on the flowchart of FIG. 7 in the same manner in the first embodiment.

An X-direction pixel superimposition unit 1215 sets a pixel array to be subjected to filter processing in the same manner as in the first embodiment, and performs filter processing for the set pixel array by using the filter coefficients acquired by the LUT access unit 1213. The X-direction pixel superimposition unit 1215 then stores the image having undergone the filter processing, which has been generated by this processing, in a frame memory 1203. Note that the memory 1214 and the frame memory 1203 both may be provided in the RAM 1132 or may be discrete memories.

A Y-direction filter unit 1204 performs filter processing for each pixel by using a filter coefficient corresponding to each pixel position in an image having undergone filter processing stored in the frame memory 1203, thereby generating an image having undergone the low-pass filter processing in the Y direction.

A post-inverse projection transformation coordinate calculation unit 1216 performs calculation based on equation (8) given above by using the inverse projection transformation parameter $M^{-1}$ to perform inverse projection transformation of the coordinate position (X, Y) on the plane Q, thereby obtaining the coordinate position (x, y) on the plane P.

A Y-direction pixel reduction ratio calculation unit 1217 calculates a reduction ratio $yo_{0\_0}$ in the Y direction in the same manner as in the first embodiment. Obviously, in this embodiment, the method of obtaining the reduction ratio $yo_{0\_0}$ in the Y direction is not limited to one method, and various other methods are conceivable.

A Y-direction filter coefficient calculation unit 1218 obtains a filter coefficient from the reduction ratio $yo_{0\_0}$ in the same manner as the X-direction filter coefficient calculation unit 1211. A Y-direction reduction ratio memory address conversion unit 1219 generates an address for reading out a filter coefficient corresponding to the reduction ratio $yo_{0\_0}$ calculated by the Y-direction pixel reduction ratio calculation unit 1217 from the lookup table in which filter coefficients are registered in correspondence with reduction ratios. This lookup table is stored in a memory 1221.

A LUT access unit 1220 accesses the address generated by the Y-direction reduction ratio memory address conversion unit 1219 in the lookup table stored in the memory 1221 to read out a filter coefficient registered at the address.

Note that the method of acquiring a filter coefficient is not limited to this, and it is possible to calculate filter coefficients by performing the processing based on the flowchart of FIG. 7 in the same manner as in the first embodiment.

A Y-direction pixel superimposition unit 1222 sets a pixel array to be subjected to filter processing in an image having undergone filter processing stored in the frame memory 1203, in the same manner as the X-direction pixel superimposition unit 1215. The Y-direction pixel superimposition unit 1222 performs filter processing for the set pixel array by using the filter coefficients acquired by the LUT access unit 1220 in the same manner as the X-direction pixel superimposition unit 1215. This filter processing is performed according to $$\text{output1.5} = \sum_{n=0}^{2p+1} \text{lpf\_input}_n \times \text{filter\_coef}_n \qquad (28)$$

A Y-direction pixel superimposition unit 1222 stores the image having undergone the filter processing, which has been generated by this processing, in a frame memory 1205. Note that the memory 1221 and the frame memory 1205 both may be provided in the RAM 1132 or may be discrete memories.

An interpolation/resampling unit 1206 performs pixel interpolation processing described with reference to the flowchart of FIG. 9 for the image having the filter processing in the frame memory 1205, in which pixel values are determined. A post-projection transformation coordinate calculation unit 1223 performs projection transformation of the coordinate position (Ix, y) on the plane P by using the projection transformation parameter M, and obtains the corresponding coordinate position (X, Y) on the plane Q.

An interpolation filter coefficient calculation unit 1224 sets a pixel array, of the pixels constituting the image having undergone the filter processing stored in the frame memory 1205, which is used for interpolation/resampling in the same manner as in the first embodiment. The interpolation filter coefficient calculation unit 1224 further obtains weight values for the set pixel array in the same manner as in the first embodiment. The processing performed by the interpolation filter coefficient calculation unit 1224 corresponds to the processing in steps S906 to S908.

A pixel interpolation unit 1225 sums up the multiplication results obtained by multiplying the pixel values of the respective pixels in the pixel array set by the interpolation filter coefficient calculation unit 1224 by corresponding weight values, and then sets the sum as a pixel value at the pixel position (X, Y) in an output image. The output image generated in this manner is sent outside this apparatus.

According to the above description, this embodiment can control a filter coefficient for a pixel of interest in accordance with the reduction ratios between pixels by projection transformation, and hence can perform proper image processing in keystone correction processing.

In addition, this embodiment can greatly increase the image processing speed by reading filter coefficients corresponding to the respective reduction ratios stored in a memory by using the reduction ratios as memory addresses.

[Other Embodiments]

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-203300 filed Sep. 10, 2010 which is hereby incorporated by reference herein in its entirety.

What is claimed is:

1. An image processing apparatus comprising:
   a unit which generates an inverse projection image by performing inverse projection transformation for an input image by using an inverse matrix of a projection transformation matrix which enlarges a size of the input image;
   a first calculation unit which, when a position of a pixel of interest on the input image is transformed into a position of an inverse projection pixel of interest on the inverse projection image by the inverse projection transformation, calculates a ratio of a distance between pixels around the position of the inverse projection pixel of interest to a distance between pixels around the position of the pixel of interest;
   a second calculation unit which calculates filter coefficients for a low-pass filter using a product of a Nyquist frequency of the input image and the ratio as a cutoff frequency; and
   a filter unit which calculates a sum of results obtained by multiplying pixel values of pixels in a pixel array including the position of the pixel of interest in the input image by the filter coefficients, as a pixel value at the position of the pixel of interest in an image having undergone filter processing.

2. The apparatus according to claim 1, further comprising a setting unit which sets a pixel value obtained by performing interpolation processing using pixel values of pixels around a pixel of interest in the image having undergone filter processing as a pixel value of the pixel of interest in an output image.

3. The apparatus according to claim 1, wherein said first calculation unit calculates a ratio of a distance between pixels arranged in a direction along a side of the input image around the position of the inverse projection pixel of interest to a distance between pixels arranged in the direction around the position of the pixel of interest, and
   said filter unit calculates, as a pixel value of the position of the pixel of interest in an image having undergone filter processing, a sum of results obtained by multiplying pixel values of pixels in a pixel array including the position of the pixel of interest in the input image and arranged in the direction by the filter coefficients.

4. An image processing method performed by an image processing apparatus, comprising:
   a step of generating an inverse projection image by performing inverse projection transformation for an input image by using an inverse matrix of a projection transformation matrix which enlarges a size of the input image;
   a first calculation step of, when a position of a pixel of interest on the input image is transformed into a position of an inverse projection pixel of interest on the inverse projection image by the inverse projection transformation, calculating a ratio of a distance between pixels around the position of the inverse projection pixel of interest to a distance between pixels around the position of the pixel of interest;
   a second calculation step of calculating filter coefficients for a low-pass filter using a product of a Nyquist frequency of the input image and the ratio as a cutoff frequency; and
   a filter step of calculating a sum of results obtained by multiplying pixel values of pixels in a pixel array including the position of the pixel of interest in the input image by the filter coefficients, as a pixel value at the position of the pixel of interest in an image having undergone filter processing.

5. A non-transitory computer-readable storage medium storing a computer program for causing a computer to function as each unit of an image processing apparatus defined in claim 1.

* * * * *